United States Patent
Seiger

(10) Patent No.: US 10,752,161 B2
(45) Date of Patent: Aug. 25, 2020

(54) HEADLAMP WITH A MECHANICAL COUPLING UNIT COUPLING THE LOW BEAM LIGHT UNIT TO THE HIGH BEAM LIGHT UNIT

(71) Applicant: Hella GmbH & Co. KGaA, Lippstadt (DE)

(72) Inventor: Ralf Seiger, Lippstadt (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 16/323,093

(22) PCT Filed: Sep. 5, 2016

(86) PCT No.: PCT/EP2016/070855
§ 371 (c)(1),
(2) Date: Feb. 4, 2019

(87) PCT Pub. No.: WO2018/041373
PCT Pub. Date: Mar. 8, 2018

(65) Prior Publication Data
US 2019/0176682 A1    Jun. 13, 2019

(51) Int. Cl.
*B60Q 1/076* (2006.01)
*F21S 41/60* (2018.01)
(Continued)

(52) U.S. Cl.
CPC ............. *B60Q 1/076* (2013.01); *B60Q 1/045* (2013.01); *B60Q 1/068* (2013.01); *B60Q 1/1423* (2013.01); *F21S 41/60* (2018.01); *B60Q 2200/36* (2013.01)

(58) Field of Classification Search
CPC ........ B60Q 1/045; B60Q 1/068; B60Q 1/076; B60Q 2200/36; B60Q 1/1423;
(Continued)

(56) References Cited

U.S. PATENT DOCUMENTS

| 2005/0190571 A1* | 9/2005 | Watson | B60Q 1/0683 |
| | | | 362/514 |
| 2009/0154190 A1* | 6/2009 | Choi | B60Q 1/0683 |
| | | | 362/549 |
| 2015/0109809 A1* | 4/2015 | Burton | B60Q 1/0483 |
| | | | 362/515 |

FOREIGN PATENT DOCUMENTS

| DE | 102009033910 A1 | 1/2011 |
| DE | 102014102867 A1 | 9/2015 |

(Continued)

OTHER PUBLICATIONS

Fahnle et al, "Motor Vehicle Headlamp", Oct. 29, 2014, Espacenet (machine translation of EP2796320A1), 27 pages.*

(Continued)

*Primary Examiner* — Alan B Cariaso
(74) *Attorney, Agent, or Firm* — Husch Blackwell LLP

(57) ABSTRACT

A headlamp for a vehicle comprising a housing, a low beam light unit and at least one high beam light unit. Both the low and high beam light units are received in the housing, along with a headlight range adjusting unit for adjusting the range of the low beam by tilting the low beam light unit about a low beam tilting axis. The headlamp comprises a mechanical coupling unit coupling the low beam light unit to the high beam light unit such that the high beam light unit is tilted about a high beam tilting axis simultaneously with the low beam light unit being tilted about the low beam tilting axis. The mechanical coupling unit comprises a coupling element, a first coupling link and a second coupling link. The first coupling link is arranged between the low beam light unit and the coupling element and the second coupling link is arranged between the high beam light unit and the coupling element.

7 Claims, 3 Drawing Sheets

(51) Int. Cl.
*B60Q 1/04* (2006.01)
*B60Q 1/068* (2006.01)
*B60Q 1/14* (2006.01)

(58) Field of Classification Search
CPC .......... F21S 41/60; F21S 41/65; F21S 41/657;
F21S 41/67; F21S 41/675
See application file for complete search history.

(56) References Cited

FOREIGN PATENT DOCUMENTS

| DE | 202015106575 U1 * | 1/2016 | .......... B60Q 1/0683 |
|---|---|---|---|
| EP | 0081399 A1 | 6/1983 | |
| EP | 2679444 A2 | 1/2014 | |
| EP | 2796320 A1 | 10/2014 | |

OTHER PUBLICATIONS

Wezel et al, "Lighting device i.e. headlight, for motor vehicle, has light modules movable relative to housing, and adjusting units exhibiting coupling element . . . , which are couple to element by joint", Jan. 27, 2011, Espacenet (machine translation of DE102009033910A1), 30 pages.*
Mikolajczak et al, "Device for adjusting the inclination of headlamps for vehicles", Jun. 15, 1983, Espacenet (machine translation of EP0081399A1), 9 pages.*
International Search Report and Written Opinion dated May 31, 2017 from corresponding PCT Application.

* cited by examiner

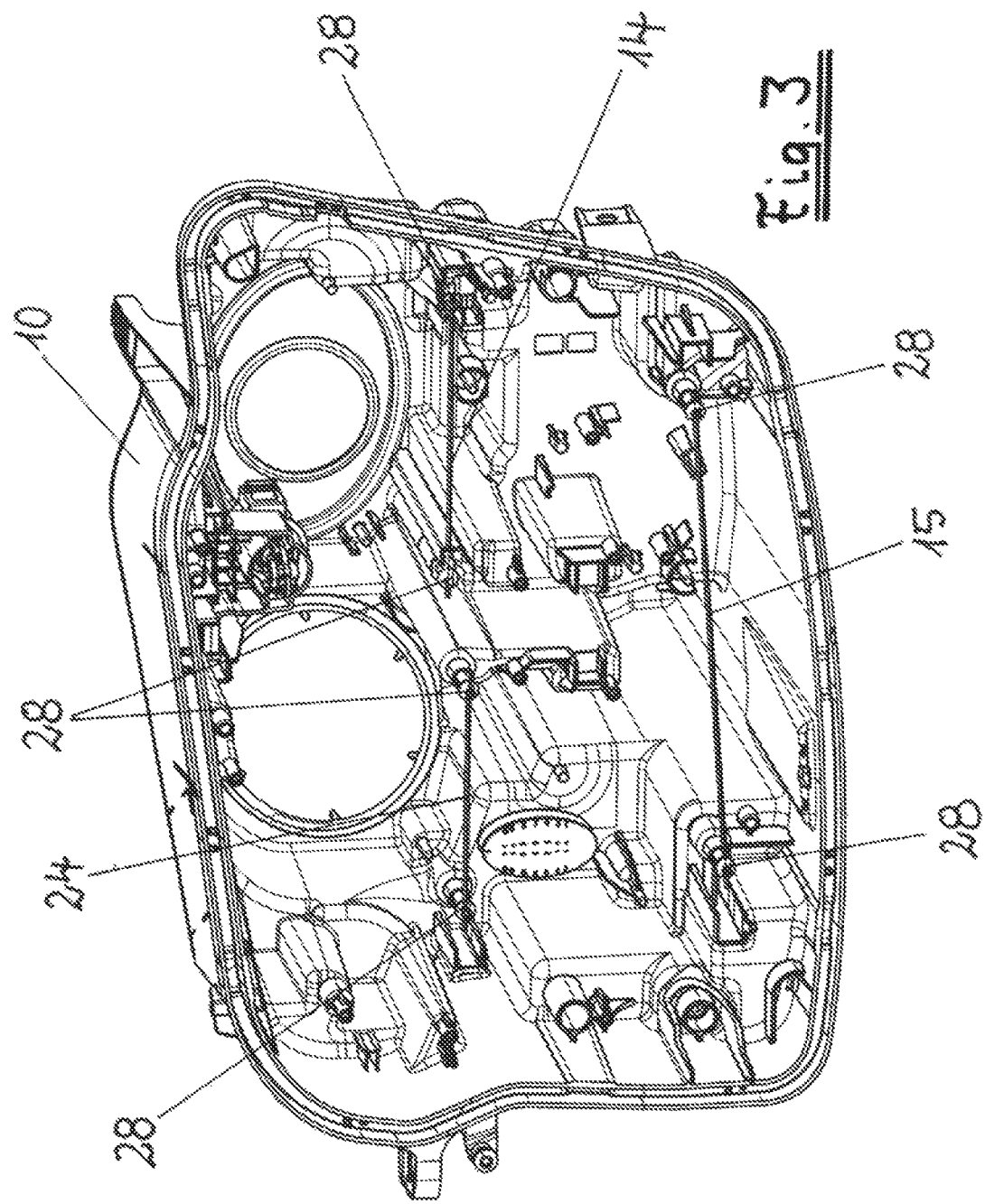

HEADLAMP WITH A MECHANICAL COUPLING UNIT COUPLING THE LOW BEAM LIGHT UNIT TO THE HIGH BEAM LIGHT UNIT

CROSS REFERENCE

This application claims priority to PCT Application No. PCT/EP2016/070855, filed Sep. 5, 2016, the entirety of which is hereby incorporated by reference.

FIELD OF THE INVENTION

The invention relates to a headlamp for a vehicle with a housing, wherein a low beam light unit and a high beam light unit are received within the housing, and wherein the headlamp comprises a headlight range adjusting unit for adjusting the range of the low beam by tilting the low beam light unit in a low beam tilting axis, and wherein the high beam light unit is tiltable about a high beam tilting axis simultaneously with tilting the low beam light unit by means of a mechanical coupling between the low beam light unit and the high beam light unit.

BACKGROUND

Most of known headlights for vehicles comprise more than one light unit. Depending on the kind of the vehicle and the regulations of the national market, it is necessary to provide a tilting mechanism for the low beam light unit as well as for the high beam light unit. Usually, the headlight range adjusting unit is coupled to the low beam light unit. In order to adjust the high beam light unit directly with the adjustment of the low beam light unit, the mechanical coupling is directly arranged between the lower and the high beam light unit. Accordingly, a simultaneous tilting of both the low beam light unit and the high beam light unit is provided.

DE 10 2009 033 910 A1 discloses a headlamp for a vehicle having a housing in which a low beam light unit and a high beam light unit are received. The headlight comprises a headlight range adjustment unit having a mechanical coupling unit for simultaneously tilting the lower and the high beam light unit. The disclosed arrangement is only feasible for applications with light units which are arranged one next to the other. However, the headlight range adjustment unit as disclosed is not applicable for headlamps comprising a low beam light unit in an upper position and a high beam light unit in a position below the low beam light unit.

Another headlamp is known from DE 10 2014 102 867 A1, which comprises a first frame for receiving a first light unit and a second frame for receiving a second a light unit. Both light units are arranged one in front of the other. A mechanical coupling is performed with a coupling means. When the headlight range adjustment unit is activated, both light units are tilted about dedicated tilting axes. However, the mechanical coupling is not suitable for light units which are arranged above each other.

SUMMARY OF THE INVENTION

The object of the present invention is providing a headlamp for a vehicle comprising at least two light units which are arranged one above the other, wherein the mechanical coupling allows for tilting both light units about an at least similar tilting angle. Herein, the tilting of both light units should be achieved with only one headlight range adjustment unit.

This object is achieved by a headlamp as taught by claim 1 of the present invention. Advantageous embodiments of the invention are defined in the dependent claims.

The invention includes the technical teaching that the mechanical coupling unit between two light units of the headlamp comprises a coupling element, a first coupling link and a second coupling link, wherein the first coupling link is arranged between the low beam light unit and the coupling element and wherein the second coupling element is arranged between the high beam light unit and the coupling element.

The main idea of the invention is the design of the mechanical coupling unit having a coupling element which enables a simultaneous tilting of a light unit which is arranged below another light unit, wherein the other light unit is coupled to the headlight range adjusting unit. The mechanical coupling unit comprises the coupling element as well as the first and the second coupling link. Both coupling links are connected to the coupling element. Further, the first light unit is coupled to the first coupling link, whereas the second light unit is coupled to the second coupling link. When the coupling element performs a tilting movement about a tilting axis, both coupling links are moved in a longitudinal direction. In other words: The first coupling link is coupled to the light unit which is connected to the headlight range adjusting unit. When the headlight range adjusting unit actuates the first light unit, this movement is transferred to a longitudinal movement of the first coupling link resulting in a tilting movement of the coupling element about a tilting axis of the coupling element. Finally, the tilting movement of the coupling element causes a longitudinal movement of the second coupling link, which is connected to the second light unit. Thus, the coupling element causes a reversion of the moving direction, and as a result, the tilting movement of the high beam light unit is the same as the tilting movement of the low beam light unit.

According to a preferred embodiment, the coupling element forms a rocker element, wherein the rocker element is tiltable arranged about a rocker tilting axis. The first coupling link is connected to the rocker element on a first side of the rocker tilting axis and the second coupling link is arranged to the rocker element on a second side of the rocker tilting axis opposite to the first side on which first coupling element is connected to the rocker element. At least this arrangement results in the reversion of the longitudinal movement of both coupling links to a simultaneous tilting of both light units in the same direction.

According to yet another embodiment, the first coupling link and the second coupling link both have the same length. The identical length of both coupling links lead to a thermosymmetric arrangement of the mechanical coupling unit. I.e., the arrangement is independent of temperature changes, as any temperature induced elongation of the coupling links is counter balanced due to the same length of the coupling links. For ensuring a complete compensation of temperature induced elongations of the coupling links, the coupling links are preferably made of one and the same material.

According to a special embodiment of the invention, the low beam light unit is arranged in an upper position within the housing (with respect to the mounting position of the headlamp in the vehicle), whereas the high beam light unit is arranged in a lower position within the housing (with respect to the mounting position of the headlamp in the vehicle). Accordingly, the headlight range adjustment unit is coupled to the low beam light unit and the high beam light unit is coupled to the low beam light unit by means of the mechanical coupling unit comprising the coupling element and the first and second coupling link.

With respect to the light emitting direction in which the light propagates, e.g. in forward direction of the vehicle, the low beam light unit is arranged in a backward position and the high beam light unit is arranged in a forward position. Accordingly, the high beam light unit is situated in front of the low beam light unit in the longitudinal direction of the car and the high beam light unit is arranged below the low beam light unit with respect to a vertical axis of the car. The arrangement must be seen in a usual mounting position of the headlamp in the vehicle.

Advantageously, the low beam light unit comprises a first reflector element and a second reflector element, wherein the first reflector element is tiltable about the low beam tilting axis and wherein the second reflector element is tiltable about a tilting axis, and wherein both reflector elements are connected to each other by means of an interconnecting element. Consequently, the low beam light unit is an assembly of the first and the second reflector element, wherein the first reflector element is some kind of basic element and the second reflector element is a coordinated reflector element. The interconnecting element extends from the first reflector element to the second reflector element. The second reflector element comprises a separate tilting axis which is disposed in a spaced arrangement with respect to the low beam tilting axis.

According to one embodiment of the present invention, the first reflector element comprises a lever arm extending in vertical direction and behind the high beam light unit, wherein the first coupling link is coupled to the low beam light unit by a connection to the lever arm. Alternatively, the lever arm can be arranged at the second reflector element. In n general, the lever arm is arranged at the low beam light unit.

According to a preferred embodiment, the lever arm comprises a connection point for tiltable receiving the low beam light unit in the housing, wherein the first coupling link is connected to the lever arm below the connection point and wherein the interconnecting element between the reflector element of the low beam light unit and the second reflector element is connected to the lever arm above the connection point. The connection point forms the central point of the low beam light unit forming a stationary point which is inactively resting in the housing of the headlamp, and the connection point may form an adjusting point for a pre-adjusting of the headlamp.

The headlight range adjusting unit may be connected to the first reflector element above the connection point and below the connection point of the coupling element which is arranged between the first reflector element of the low beam light unit and the second reflector element. When the first reflector element of the low beam light unit is tilted by the headlight range adjusting unit towards the light emitting direction, the lever arm of the first reflector element is tilted backwards with regard to the light emitting direction. This tilting of the lever arm causes a longitudinal movement of the first coupling link and thus a tilting of the coupling element of the mechanical coupling unit. Due to the interconnection of the coupling element to the high beam light unit via the second coupling link, the high beam light unit also tilts towards the light emitting direction. In other words, the low beam light unit and in particular its first reflector element forms some kind of a seesaw, and due to the movement reversion of the mechanical coupling unit both the low beam light unit and the high beam light unit perform the same tilting movement in the same direction when the headlight range adjusting unit gets activated.

BRIEF DESCRIPTION OF THE DRAWINGS

Reference is now made more particularly to the drawings, which illustrate the best presently known mode of carrying out the invention and wherein similar reference characters indicate the same parts throughout the views.

FIG. 3 is a view of the housing showing the tilting axis of the light units within the housing.

DETAILED DESCRIPTION OF THE DRAWINGS

Figure 1:
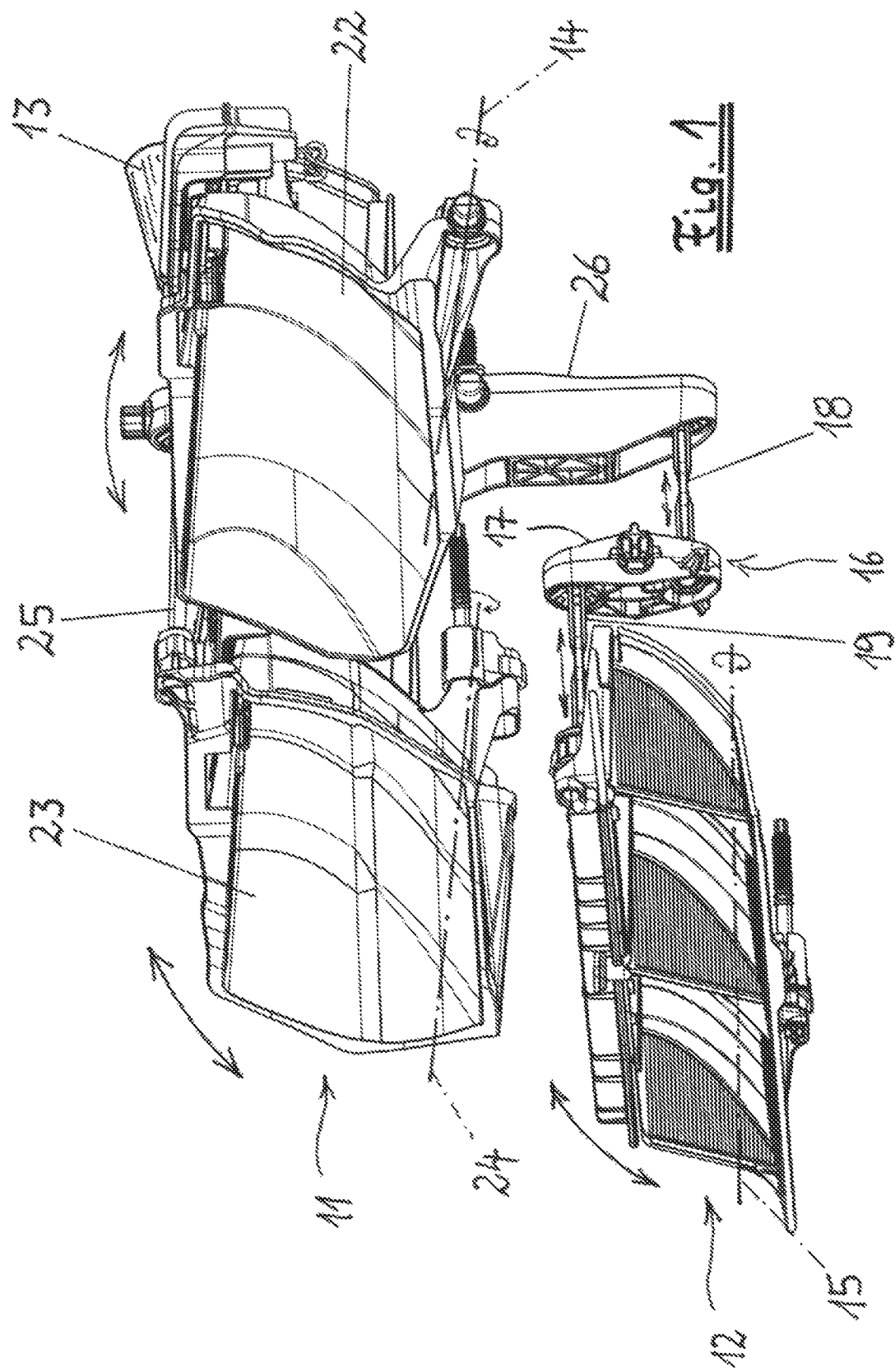
FIG. 1 is a perspective view of the low beam light unit and the high beam light unit and the mechanical coupling unit between both light units.

FIG. 1 shows a perspective view of the low beam light unit 11 and the high beam light unit 12. The low beam light unit 11 is arranged above the high beam light unit 12. The high beam light unit 12 is coupled to the low beam light unit 11 by means of a mechanical coupling unit 16 which is rotatably supported within the housing of the headlamp (not shown).

The low beam light unit 11 comprises a reflector element having a first reflector 22 and a second reflector element 23. The first reflector element 22 is tiltable about a low beam tilting axis 14, and the second reflector element 23 is tiltable about a tilting axis 24 located at a distance from the low beam tilting axis 14.

The first reflector element 22 and the second reflector element 23 together build a part of the low beam light in front of the vehicle. However, the reflectors 22 and 23 are tiltable about different axis 14 and 24. In order to couple both reflector elements 22 and 23, an interconnecting element 25 is arranged between both reflectors 22 and 23.

The reflector element 22 comprises a lever arm 26, to which the mechanical coupling unit 16 is connected. The mechanical coupling unit 16 comprises a coupling element 17, a first coupling link 18 and a second coupling link 19. The first coupling link 18 is connected to the free end of the lever arm 26. The second coupling link 19 is coupled to the high beam light unit 12. For rotatably supporting the mechanical coupling unit 16, the coupling element 17 comprises two studs which are provided on opposite sides of the coupling element 17 and each extend in direction of axis 21 (compare FIG. 2).

When the low beam light unit 11 is actuated by the headlight range adjusting unit 13, the reflector elements 22 and 23 perform a tilting movement as shown in FIG. 1 by the double-arrows. Accordingly the lever arm 26 performs an opposite tilting movement about the low beam tilting axis 14. This movement of the lever arm 26 is transmitted to the high beam light unit 12 via the first coupling link 18, the coupling element 17 and the second coupling link 19, such that the high beam light unit 12 and the low beam light unit 11 are synchronously tilted about their corresponding tilt axis 14 and 15.

Figure 2:
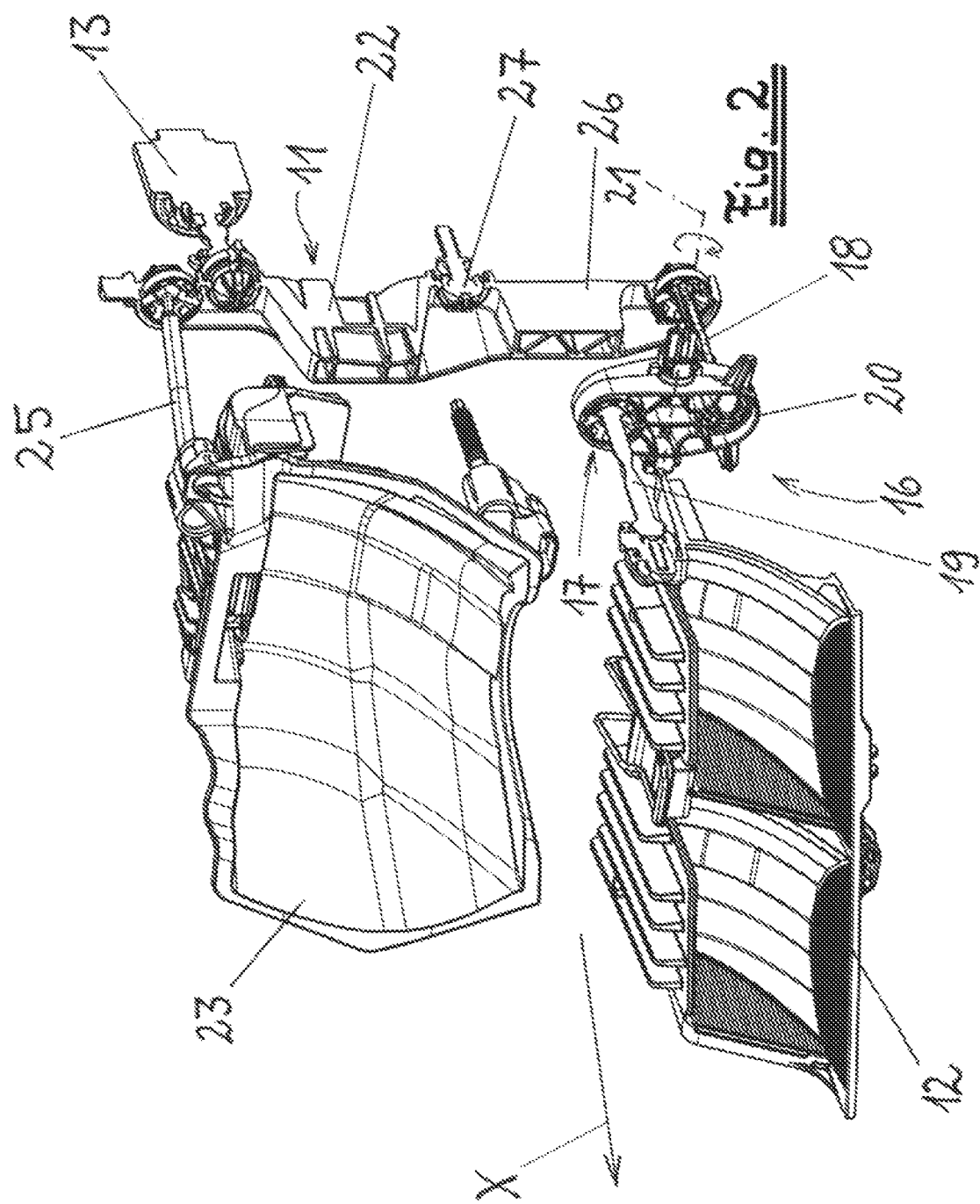
FIG. 2 is a cross sectioned perspective view of the low beam light unit and the high beam light unit with a detailed illustration of the mechanical coupling unit.

FIG. 2 shows a cross sectioned perspective view of the high beam light unit 11 and the low beam light unit 12. The high beam light unit 11 comprises the first reflector element 22 and the second reflector element 23. In the cross section, an interconnecting element 25 is shown between the reflector element 22 and the second reflector element 23.

When the reflector element 22 is tilted by the headlight range adjusting unit 13 about the connection point 27 in clockwise direction, the upper part of the reflector element 22 and thus the second reflector element 23 are tilted backwards with respect to the light emitting direction X. This movement causes a movement of the lever arm 26 towards the light emitting direction X. Accordingly, the rocker element 20, which is coupled to the lever arm 26 via the first coupling link 18, is also tilted about the rocker tilting axis 21 in clockwise direction. I.e., the coupling element 17 forms a rocker element 20, wherein the attachment of the second coupling link 19 on the opposite side of the first coupling link 18 causes a tilting movement of the high beam light unit 12 also in a clockwise direction. In other words, the mechanical coupling unit 16 reverses the tilting direction of the lever arm 26 (which is a part of the reflector element 22). As a result, the high beam light unit 12 and the low beam light unit 11 perform (at least almost) the same tilting movement in the same direction.

FIG. 3 shows a perspective view of the housing 10 of the headlamp. As shown in FIG. 3, a number of ball joints 28 is arranged in the body of the housing 10. Pairs of ball joints 28 are interconnected by imaginary lines illustrating the tilting axis of the first reflector element 22, the second reflector element 23 and the high beam light unit 12. In detail, the tilting axis 24 between the two upper left ball joints 28 represents the tilting axis of the second reflector element 23. The low beam tilting axis 14 is located at a distance from the tilting axis 24. The high beam tilting axis 15 is also arranged apart from the low beam axis 14 and the tilting axis 24. As can be seen in the perspective view, the high beam tilting axis 15 and the low beam tilting axis 14 are not parallel to each other, but they are arranged in a distance and with a slight inclination. This shows another advantage of the mechanical coupling unit 16 of the present invention, as the tilting axes may be also arranged in a non-parallel manner relative to each other.

The present invention is not limited to the embodiment described above, which is represented as an example only and can be modified in various ways within the scope of protection defined by the pending patent claims. Thus, the invention is also applicable to different embodiments, in particular regarding the design of the upper and low beam light units.

LIST OF NUMERALS 10 housing
11 low beam light unit
12 high beam light unit
13 headlight range adjusting unit
14 low beam tilting axis
15 high beam tilting axis
16 mechanical coupling unit
17 coupling element
18 first coupling link
19 second coupling link
20 rocker element
21 rocker tilting axis
22 first reflector element
23 second reflector element
24 tilting axis
25 interconnecting element
26 lever arm
27 connection point
28 ball joint
X light emitting direction

The invention claimed is:
1. A headlamp for a vehicle comprising:
a housing,
a low beam light unit and a high beam light unit which are received in the housing,
a headlight range adjusting unit for adjusting the range of the low beam by tilting the low beam light unit about a low beam tilting axis, and
a mechanical coupling unit coupling the low beam light unit to the high beam light unit such that the high beam light unit is tilted about a high beam tilting axis simultaneously with the low beam light unit being tilted about the low beam tilting axis,
wherein the mechanical coupling unit comprises a coupling element, a first coupling link and a second coupling link, wherein the first coupling link is arranged between the low beam light unit and the coupling element, and the second coupling link is arranged between the high beam light unit and the coupling element,
wherein the first reflector element is tiltable about the low beam tilting axis, the second reflector element is arranged in the housing and is tiltable about a tilting axis, and both reflector elements are connected to each other by means of an interconnecting element,
wherein the first reflector element comprises a lever arm extending in vertical direction and behind the high beam light unit, wherein the first coupling link is coupled to the low beam light unit by a connection to the lever arm,
wherein the lever arm comprises a connection point for tiltable receiving the low beam light unit in the housing, and wherein:
the first coupling link is connected to the lever arm below the connection point and
the interconnecting element between the reflector element of the low beam light unit and the second reflector element is connected to the lever arm above the connection point.
2. The headlamp according to claim 1, wherein the coupling element forms a rocker element, wherein the rocker element is tiltable arranged about a rocker tilting axis.
3. The headlamp according to claim 2, wherein the first coupling link is connected to the rocker element on a first side of the rocker tilting axis and the second coupling link is connected to the rocker element on a second side of the rocker tilting axis opposite to the first side.
4. The headlamp according to claim 1, wherein the first coupling link and the second coupling link both have the same length.
5. The headlamp according to claim 1, wherein the low beam light unit is arranged in an upper position and the high beam light unit is arranged in a lower position within the housing in relation to a mounting position of the headlamp in the vehicle.
6. The headlamp according to claim 1, wherein the low beam light unit is arranged in a backward position and the high beam light unit is arranged in a forward position with respect to the light emitting direction (X).
7. The headlamp according to claim 1, wherein the headlight range adjusting unit is connected to the reflector element above the connection point and below a connection point of the interconnecting element which is arranged between the reflector element of the low beam light unit and the second reflector element.

\* \* \* \* \*